March 9, 1965  J. E. SMITH  3,172,458
SPEED LIMITER FOR FUEL BURNING ENGINES
Filed Feb. 7, 1962  3 Sheets-Sheet 1

INVENTOR.
JOHN E. SMITH
BY Whittemore Hulbert
 & Belknap
ATTORNEYS

March 9, 1965    J. E. SMITH    3,172,458
SPEED LIMITER FOR FUEL BURNING ENGINES
Filed Feb. 7, 1962    3 Sheets-Sheet 3

INVENTOR.
JOHN E. SMITH
BY Whittemore, Hulbert
& Belknap
ATTORNEYS

United States Patent Office 3,172,458
Patented Mar. 9, 1965

3,172,458
SPEED LIMITER FOR FUEL BURNING ENGINES
John E. Smith, Rochester, Mich., assignor to Holley Carburetor Company, Warren, Mich., a corporation of Michigan
Filed Feb. 7, 1962, Ser. No. 171,681
3 Claims. (Cl. 158—36.3)

The present invention relates to a speed limiter and more particularly to high rotative speed equipment for a fuel burning engine such as a gas turbine engine. The present invention is characterized by the manner in which governing or control means is employed which will prevent the engine from reaching a speed beyond a predetermined limit. The control means is employed between the shaft of the engine and the main fuel supply passage and is in addition to and independent of the normal or conventional fuel regulating and governing controls.

In the past considerable damage has sometimes been done to gas turbine engines where the engines have reached speeds beyond the operating speeds which are safe for the pilots and for the engines. In most cases, the overspeed of a gas turbine engine cannot be prevented by the normal engine regulating and governing controls provided for this purpose because the damaging overspeeds usually result from some type of failure in the engine fuel controls so as to cause excessive fuel flow and the subsequent overspeed.

The present invention has overcome this problem by providing a separate speed limiting or governing device which is responsive to the speed of the engine for cutting off the fuel supply to the engine in the event of the failure of the engine or related equipment which causes rapid speed increases (far faster than normal). In such a case the regular governing system does not react fast enough even when operating at its maximum capability.

The present invention employs a supplemental speed limiting device which depends upon the centrifugal force of a rotating ring or washer to trip a micro-switch which actuates a solenoid operated valve employed in the fuel supply passage.

An important feature of this invention is the provision of a deflector ring which is bent upwards and downwards on an offset plane, thus displacing its center of gravity from the radial plane of the ring or washer. The ring may have a shape which is elliptical or round. The ring is actually a spring when contacting the surface of the loading plate. The ring has a preload which may be incorporated in the spring itself as a restorative force or applied by the loading plate as an external force. When the speed limiting device is at rest the loads or forces are equal and opposite. The preload when incorporated in the ring itself is selected to induce a moment in opposition to the moment caused by the centrifugal force of the ring times its centroidal distance from its radial plane. The normal tendency of the bent ring when rotating at the high r.p.m. of the engine is to straighten itself. However, the ring cannot straighten out because of its internal preload until a certain rotative speed of the shaft of the engine is reached. Upon the attainment of the predetermined rotative speed, the ring continues to bend in the direction of its radial plane until it makes contact with the micro-switch. The control or governing mechanism of the present invention may be set to trip the micro-switch, as an example, at about 110% maximum desired speed, thereby insuring that the valve controlled by the switch will close the fuel supply passage before the engine overspeeds at 115%.

It is an object of the present invention to provide a fuel control system for a fuel burning engine having a fuel supply passage and supplemental fuel control means responsive solely to the speed of the engine for closing the fuel supply passage upon the attainment of a speed above 100% normal engine speed.

Another object of the present invention is to provide a fuel control system of the aforementioned type wherein the speed responsive fuel control means is in addition to the fuel control mechanism which is normally employed for controlling the application of fuel through the supply passage to the engine at speeds below 100% normal engine speed.

Still another object of the present invention is to provide a fuel control system of the aforementioned type wherein a control valve independent of the normal fuel control mechanism is employed in the fuel supply passage, and control means is interconnected between the shaft of the engine and the control valve for moving the valve in a direction to close the fuel supply passage upon the attainment of a predetermined engine speed.

A further object of the present invention is to provide a fuel control system of the aforementioned type wherein the control valve is located downstream of the normal fuel control mechanism.

Another object of the present invention is to provide an electrical switch for controlling the position of the control valve in the supply passage, said switch being actuated by a part of the shaft of the engine upon the attainment of a predetermined shaft speed to move the valve in a direction to close the fuel supply passage.

Still another object of the present invention is to provide a deflector ring mounted on the shaft under an initial internal preload and located opposite the switch and which is effective upon the attainment of a predetermined shaft speed to overcome its preload and energize the switch to move the valve in a direction to close the fuel supply passage.

A further object of the present invention is to provide a fuel control system wherein primary and secondary fuel control mechanisms are employed. The primary mechanism is effective to control the amount of fuel delivered to the engine at speeds at or below 100% engine speed and the secondary fuel control mechanism being effective upon increases in engine speeds due to abnormal operation of the engine to terminate the delivery of fuel to the engine at speeds above 100% engine speed.

A further object of the present invention is to provide a fuel control system wherein a speed responsive washer or ring with an initial preload is mounted on the shaft of the engine for controlling a solenoid operated control valve in the fuel supply passage.

It is thus another object of this invention to provide a simplified low cost structure of the aforementioned type having certain advantages contributing to efficiency, reliability and long life as well as ease of maintenance.

Other objects and features of the invention will become apparent as the description proceeds, especially when taken in conjunction with the accompanying drawings, wherein:

FIG. 5 is an elevational view partly in section illustrating in particular the electrical connection between the micro-switch and the solenoid operated control valve of the present invention.

FIG. 6 is a schematic illustration showing the position of the deflector ring at various shaft speeds.

Figure 1:
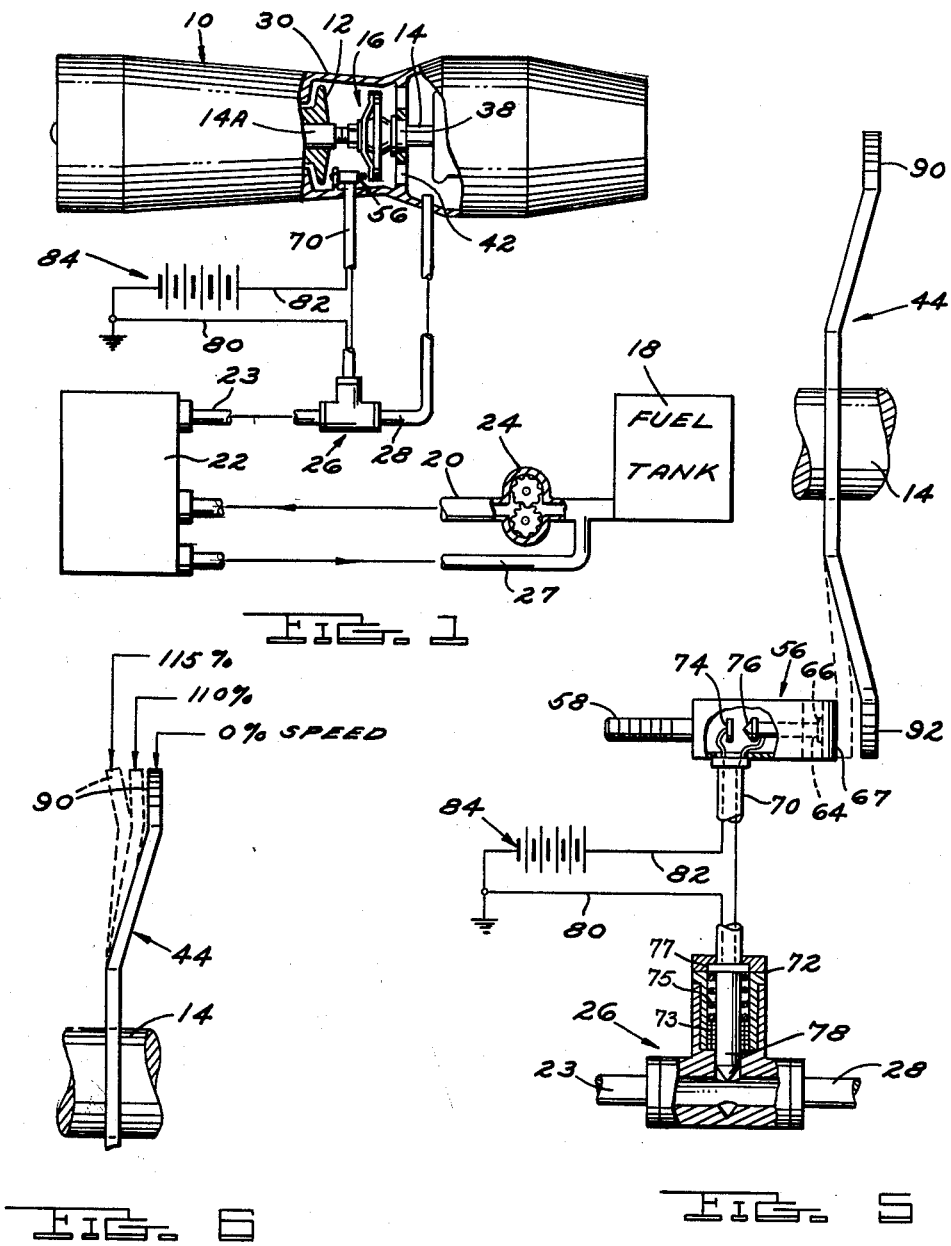
FIG. 1 is a schematic illustration partly in cross section illustrating the invention as applied to a gas turbine power plant.

Referring now to the drawings, FIG. 1 illustrates a gas turbine power plant which is designated by the numeral 10. The power plant 10 has a compressor 12 with a shaft 14 which has mounted thereon the speed limiter or speed limiting assembly 16 which embodies the present invention. The fuel supply tank 18 is connected to the gas turbine power plant 10 by means of the main fuel supply passage 20. The normal fuel regulating and governing control mechanism 22 is interposed in the fuel supply passage 20 and is effective for controlling the application of fuel to the gas turbine power plant 10 at operating speeds of the engine generally at or below 100% engine speed. The fuel tank 18 is connected to the fuel pump 24 which in the present case is illustrated as a conventional gear type pump. The pump 24 is effective to draw fuel from the tank 18 and deliver it through the fuel supply passage 20 to the gas turbine power plant 10 upon signal from the control mechanism 22. Interposed between the fuel control mechanism 22 and the upstream side of the fuel pump 24 is a bypass 27 which is effective to return excessive fuel from the fuel supply conduit 20 to the supply tank 18. The fuel control mechanism 22 may take one of any number of types well known in the art, its primary purpose being to regulate and govern the delivery of fuel from the supply tank 18 to the gas turbine power plant 10 under normal operating conditions.

The fuel supply passage 20 includes a supply passage 23 which is connected between the control mechanism 22 and a solenoid operated valve 26 which is generally in the open position as illustrated in FIG. 5 during the normal operation of the engine. Another passage 28 connects the valve 26 to the power plant 10. The power plant 10 includes a housing 30 for the shaft 14 and in which the speed limiting assembly 16 is mounted.

Figure 2:
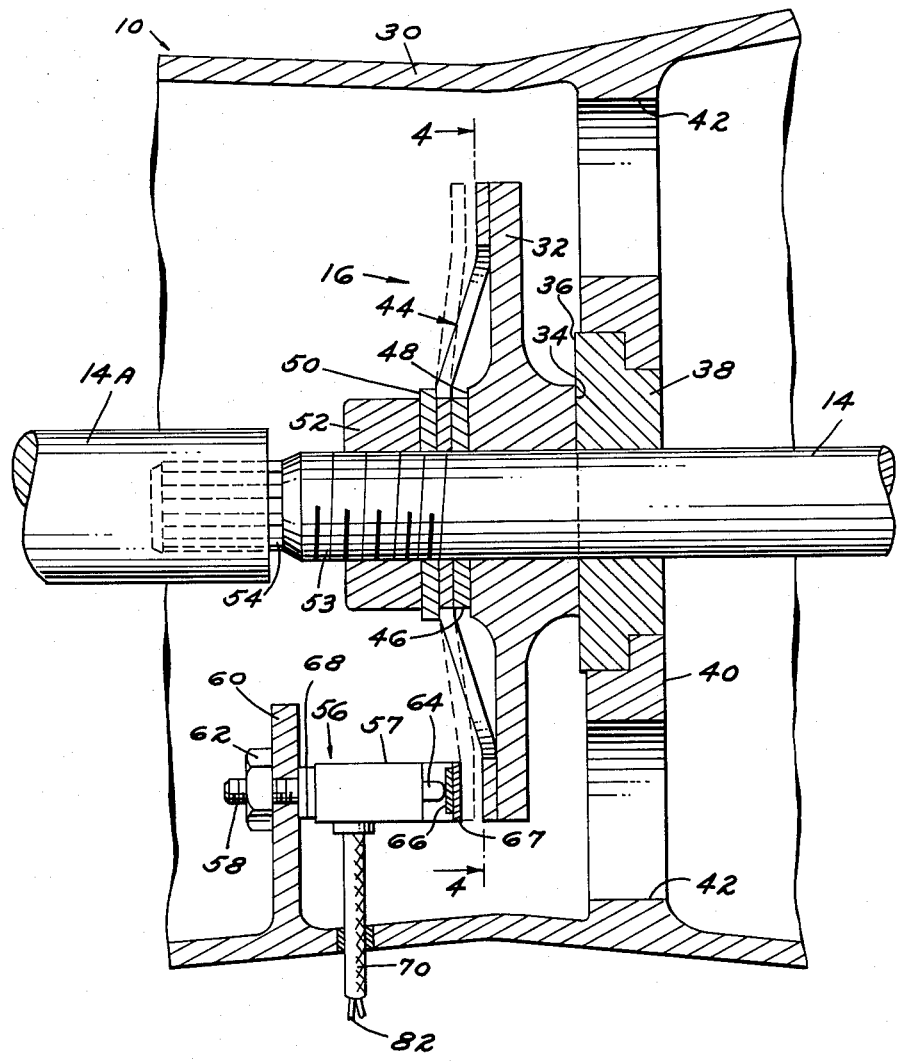
FIG. 2 is an enlarged elevational view of the present invention in cross section.

Referring now more specifically to FIG. 2 the speed limiting assembly 16 includes an annular backup or loading plate 32 which is sleeved on the shaft 14 and which has one end wall 34 in surface to surface contact with the end wall 36 of the bearing 38. The bearing 38 is carried by the transverse partition 40 in the housing 30. The partition 40 is provided with a plurality of circumferentially spaced, axially extending openings 42 which connect opposite sides of the partition 40.

Figure 4:
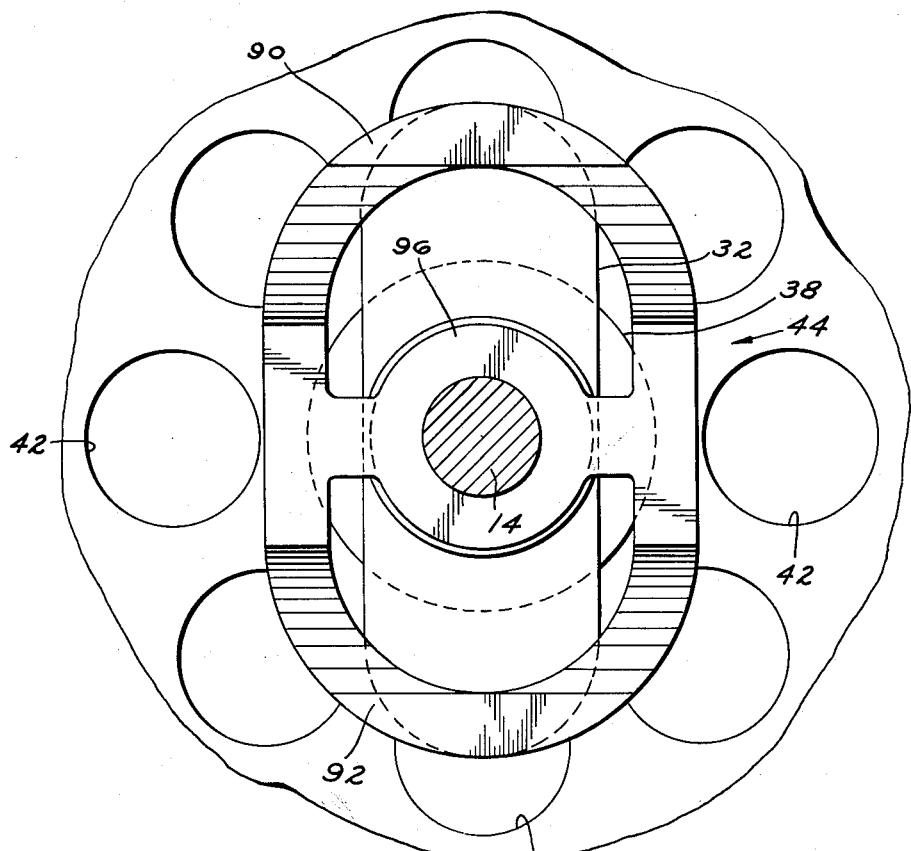
FIG. 4 is a front elevational view partly in section taken on the line 4—4 of FIG. 2 and looking in the direction of the arrows.

The assembly 16 also includes a deflector ring or washer 44, under an initial preload, which is best illustrated in FIG. 4. The preload of the ring 44 is within the ring itself as a restorative force, the force being the result of the internal deflection of the ring by the back-up plate 32. A calibrating shim 46 for varying the preload of the ring 44 is provided between the other end wall 48 of the backup plate 32 and the opposite side of the deflector ring 44. A lock washer 50 and a clamping nut 52 are threaded onto a portion of the end 53 of the shaft 14 for holding the deflector ring 44, the calibrated adjustment shim 46, and the backup plate 32 in an assembled locked position as best illustrated in FIG. 2. The end 53 of the shaft 14 is also provided with a spline 54 for connection to the shaft extension 14A.

The speed limiting device 16 further includes a microswitch 56 provided with a threaded stem 58. The stem 58 extends through a wall 60 provided in the housing 30. A nut 62 is threaded on the stem 58 to hold the microswitch 56 in a predetermined assembled position with respect to the deflector ring 44. The micro-switch assembly 56 includes a movable or actuating contact pin 64 which is movably carried by the switch casing 57. The microswitch 56 is also provided with an adjustable pin cover 66 for the pin 64. The pin cover 66 is fixed to and movably carried by an adjustable tab 67 mounted on the casing 57. Adjustable shims 68 are provided between the casing 57 and the wall 60 of the housing 30. A wiring harness assembly 70 is connected on one end thereof to the microswitch 56 and on the other end is connected to a conventional solenoid 72 which is employed to operate the valve 26. The solenoid 72 includes windings 73 which surround the valve plunger 78. The valve plunger 78 is held open, out of the passage 23 by a spring 75, when the solenoid 72 is not energized. The spring 75 is interposed in the housing of the valve 26 between the top of the winding 73 and the flange 77 provided on the plunger 78. Energization of the solenoid 72 is effective to overcome the bias of the spring 75 to permit the plunger 78 to close.

As best illustrated in FIGURE 5 the micro-switch 56 is provided with an electrical contact 74 which is spaced lengthwise from the electrical contact 76 provided on the actuating contact pin 64.

The solenoid operated valve 26 includes the valve plunger 78 which is movable in the stem of the valve 26. The wiring harness assembly includes a ground wire 80 which is interposed between the solenoid 72 and the ground while a power wire 82 is interposed between the battery 84 and the micro-switch 56 to complete the electrical circuit.

As best illustrated in FIG. 4, the deflector ring 44 is provided with a pair of peripheral actuating arms 90 and 92 which are under an initial preload. The arms 90 and 92 are connected to the central annular portion 96 of the ring 44 and are adapted to be moved with respect thereto upon the attainment of a predetermined shaft speed, as will be subsequently described.

Figure 3:
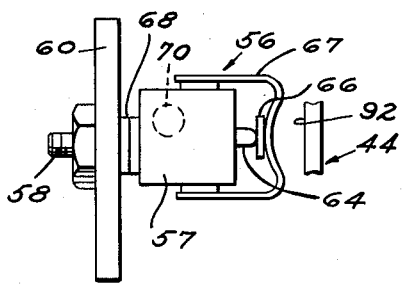
FIGURE 3 is an enlarged plan view of the present invention illustrating the switch portion of the invention in greater detail.

The initial open position of the micro-switch 56 is adjusted by crimping the adjustable tab 67 up or down as best illustrated in FIGURE 3, the direction depending upon the position desired. The clearance between the deflector ring 44 and the pin cover 66 may be adjusted by adding or removing shims 68 between the wall 60 of the housing 30 and the casing 57 of the micro-switch 56.

The speed limiting device 16 is adapted to come into operation to control the flow of fuel through the fuel supply passage 20 to the power plant 10 when in the event of engine or related equipment failure the speed of the engine rapidly increases to a point beyond the normal operating speed for which the primary control mechanism 22 is intended to govern.

With the invention assembled as shown in solid lines, the deflector ring 44 has therein an initial preload set compression which partially straightens out the deflector ring 44 and prevents further straightening until the speed of the shaft 14 exceeds its maximum normal operating speed. Once the set speed is exceeded the deflector ring 44 acts as a spring and begins to move and continues to move until such time as the actuating arms 90 and 92 thereof are moved to the left as viewed in FIG. 5 to the position represented by the dotted lines to actuate the micro-switch 56.

The deflector ring 44 has an initial preload which actually takes the travel out of the deflector ring 44 that would normally occur between zero percent speed and some speed appreciably above 100% but definitely less than 110% or whatever the trip speed is selected to be. Without the initial preload the condition of the deflector ring 44 would be continually waving back and forth even though the engine was operating at normal speeds. As previously mentioned, the internal preload of the deflector ring 44 is selected to induce a moment in opposition to the moment caused by the centrifugal force of the deflector ring 44 times the centroidal distance from its radial plane. The normal tendency of the bent ring 44 when rotating at a high engine r.p.m. is to straighten itself. However, this will not be accomplished due to the preload until a certain rotative speed of the engine is reached. Once this speed is reached the actuating arms 90 and 92 of the deflector ring 44 are bent in the direction of its radial plane until it makes contact with the micro-switch 56. As illustrated by FIGURE 6, the mechanism, as an example, may be set to trip the micro-switch 56 at about 110% maximum desired speed thus insuring that the fuel flow to the engine 10 will be terminated before the engine overspeeds to 115%. However the spring or ring 44 actually starts to move away from the plate 32 at some speed appreciably above 100% but definitely less than 110%, as an example, 105% or 108%. The difference between the trip speed and the speed when the ring 44 starts to move is necessary since it takes a slight speed increase to travel the gap distance to the switch 56 and then a little more travel to close the internal gap in the switch 56.

It should be noted that only the actuating arms 90 and 92 of the deflector ring 44 touch the adjustable tab 67 to actuate the micro-switch assembly 56. The intermittent striking of the pin cover 66 does not mean that contacts 74 and 76 are continually opening and closing since it is an easy operation to adjust the limiting operating frequency of the micro-switch 56 to be considerably less than the frequency which the actuating arms 90 and 92 provided on the deflector ring 44 contact the actuating pin 64 of the micro-switch 56 or the pin cover 66.

The drawings and the foregoing specification constitute a description of the improved speed limiter in such full, clear, concise and exact terms as to enable any person skilled in the art to practice the invention, the scope of which is indicated by the appended claims.

What I claim as my invention is:

1. A control system for a fuel burning engine having a casing forming an air inlet, combustion chamber and an outlet, a compressor, a combustion apparatus in the combustion chamber supplied by the compressor, a turbine energized by the combutsion apparatus, and a shaft operatively connecting the turbine with the compressor, said control system comprising a source of fuel, a fuel supply passage connecting said source of fuel to the combustion chamber, primary fuel control mechanism for said supply passage effective to control the amount of fuel delivered to the engine at speeds at or below the maximum normal engine operating speed, and secondary fuel control mechanism for said supply passage effective upon increases in the aforesaid maximum normal engine operating speed due to abnormal operation of the engine to terminate the delivery of fuel to the engine, said secondary fuel control mechanism comprising a flexible control washer encircling said shaft and including an inner portion fixedly mounted on said shaft occupying a substantially radial plane and an outer portion offset from said inner portion to locate the center of gravity of said washer on the side of said radial plane opposite the turbine, a back-up plate fixedly mounted on the shaft engageable with said outer portion of said washer for determining the preload of said washer, the preload of said washer being selected and arranged to induce a moment in opposition to the moment caused by the centrifugal force of said washer times the centroidal distance from said radial plane, a solenoid operated normally opened control valve for said supply passage between said primary fuel control mechanism and the engine, an electrical circuit including a normally opened electrical switch which is mounted in the interior of the casing adjacent said radial plane and a source of electrical energy, said circuit being operatively connected to said control valve for energizing said solenoid so as to close said valve upon closing of said electrical switch, the preload of said washer being gradually overcome upon the attainment of predetermined shaft speeds corresponding to speeds over the maximum normal engine operating speed so that the outer portion of said washer is moved away from said back-up plate by centrifugal force to a position to close said switch, energize said circuit and thereby move said control valve to a closed position to block the flow of fuel through said supply passage.

2. The control system defined in claim 1 wherein said electrical switch is a micro-switch which is provided with an adjustable cover, said outer portion of said washer being adapted to move said cover in a direction to close the contacts in said micro-switch and energize said electrical circuit.

3. The control system defined in claim 1 wherein said washer is substantially elliptical.

References Cited in the file of this patent

UNITED STATES PATENTS

| | | |
|---|---|---|
| 453,287 | Macrae | June 2, 1891 |
| 675,871 | DaRozir | June 4, 1901 |
| 1,008,550 | Loewenstein | Nov. 14, 1911 |
| 2,609,868 | Carey | Sept. 9, 1952 |
| 2,831,671 | Leonard | Apr. 22, 1958 |
| 2,832,193 | Wood | Apr. 29, 1958 |
| 2,973,771 | Barth et al. | Mar. 7, 1961 |

FOREIGN PATENTS

| | | |
|---|---|---|
| 1,073,066 | Germany | Jan. 14, 1960 |